United States Patent
Chen

(10) Patent No.: US 10,142,476 B1
(45) Date of Patent: Nov. 27, 2018

(54) CALL RECONNECTION

(71) Applicant: UJET, Inc., San Francisco, CA (US)

(72) Inventor: Eli Chen, San Mateo, CA (US)

(73) Assignee: UJET, Inc., San Francisco, CA (US)

( * ) Notice: Subject to any disclaimer, the term of this patent is extended or adjusted under 35 U.S.C. 154(b) by 0 days.

(21) Appl. No.: 15/700,019

(22) Filed: Sep. 8, 2017

(51) Int. Cl.
*H04M 3/00* (2006.01)
*H04M 5/00* (2006.01)
*H04M 3/42* (2006.01)
*H04M 1/00* (2006.01)
*H04M 3/523* (2006.01)
*H04M 3/56* (2006.01)
(Continued)

(52) U.S. Cl.
CPC ....... *H04M 3/5231* (2013.01); *H04M 3/5183* (2013.01); *H04M 3/56* (2013.01); *H04M 3/58* (2013.01); *H04M 2203/2088* (2013.01); *H04M 2203/5027* (2013.01)

(58) Field of Classification Search
CPC .. G10L 15/00; G06Q 10/06; G06Q 10/06316; G06Q 30/016; H04L 51/02; H04L 51/046; H04L 51/24; H04L 51/30; H04M 2203/2088; H04M 2203/40; H04M 2203/401; H04M 2203/2011; H04M 2203/2061; H04M 2242/00; H04M 2242/08; H04M 2242/12; H04M 3/2281; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 3/56; H04M 3/58; H04W 4/14
USPC ........... 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS 4,807,274 A * 2/1989 Kousa ..................... H04M 3/24
379/22
5,867,494 A * 2/1999 Krishnaswamy ... H04L 12/1485
370/352
(Continued)

*Primary Examiner* — Khai N. Nguyen
(74) *Attorney, Agent, or Firm* — Royse Law Firm, PC

(57) ABSTRACT

In various embodiments, a call is received at a call center system from a client device of a caller. Caller connection logic, automatically connects the client device of the caller to a conference line. Agent connection logic automatically connects a call agent to the conference line. Disconnection analysis logic determines that a party to the conference line was disconnected from the conference line, the party to the conference line being one of the client device of the caller and the call agent. Disconnection analysis logic detects an indication that the party was disconnected. Based on the detecting, the reconnection logic automatically initiating a reconnection of the party to the conference line.

19 Claims, 3 Drawing Sheets

(51) Int. Cl.
*H04M 3/58* (2006.01)
*H04M 3/51* (2006.01)

(56) References Cited

U.S. PATENT DOCUMENTS

| | | | | |
|---|---|---|---|---|
| 5,907,676 | A * | 5/1999 | Fujishiro | H04W 80/06 709/203 |
| 6,360,247 | B1 * | 3/2002 | Fujishiro | H04W 80/06 709/203 |
| 6,404,747 | B1 * | 6/2002 | Berry | H04M 3/51 370/270 |
| 6,731,625 | B1 * | 5/2004 | Eastep | H04L 29/06 370/352 |
| 6,909,708 | B1 * | 6/2005 | Krishnaswamy | H04L 12/1813 370/352 |
| 8,494,503 | B2 * | 7/2013 | Winter | H04M 3/56 370/260 |
| 2011/0143736 | A1 * | 6/2011 | Winter | H04M 3/56 455/416 |

* cited by examiner

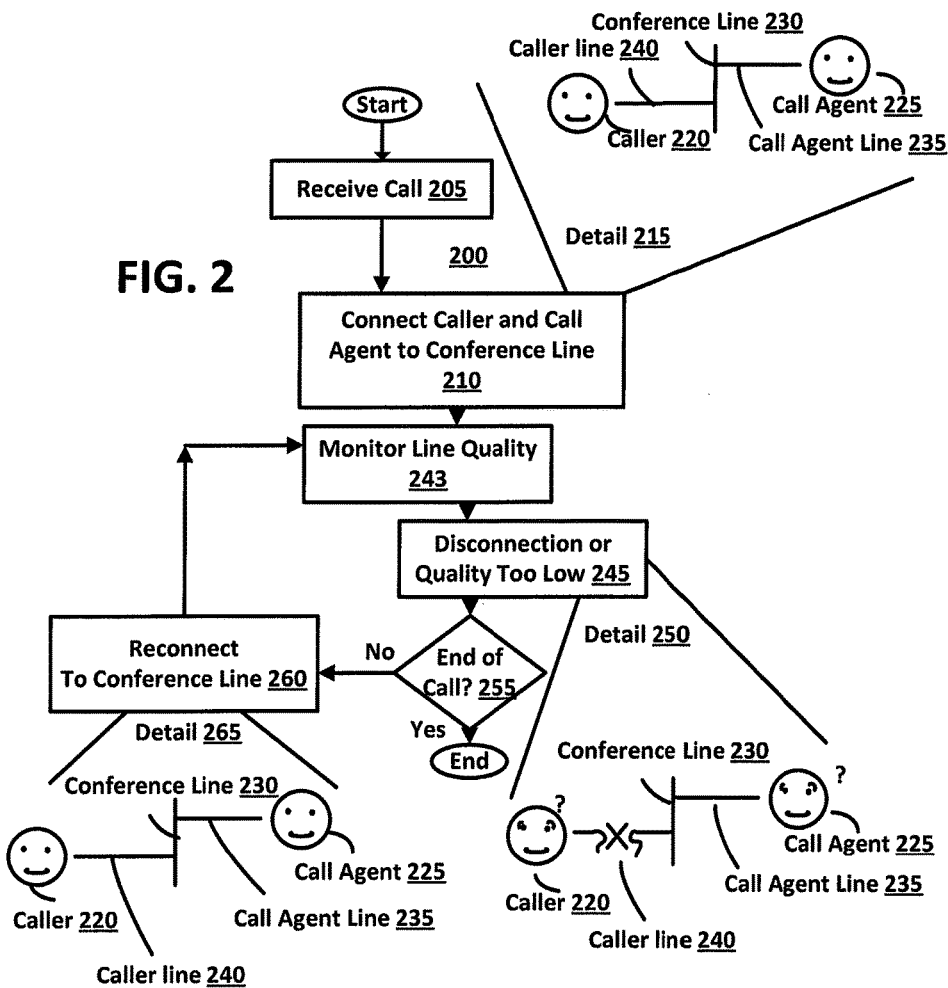
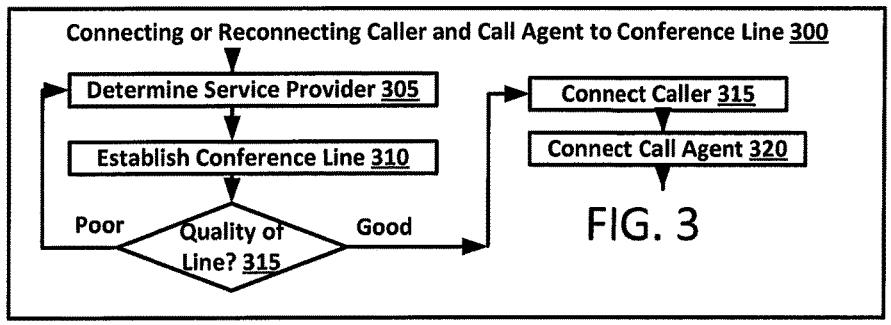

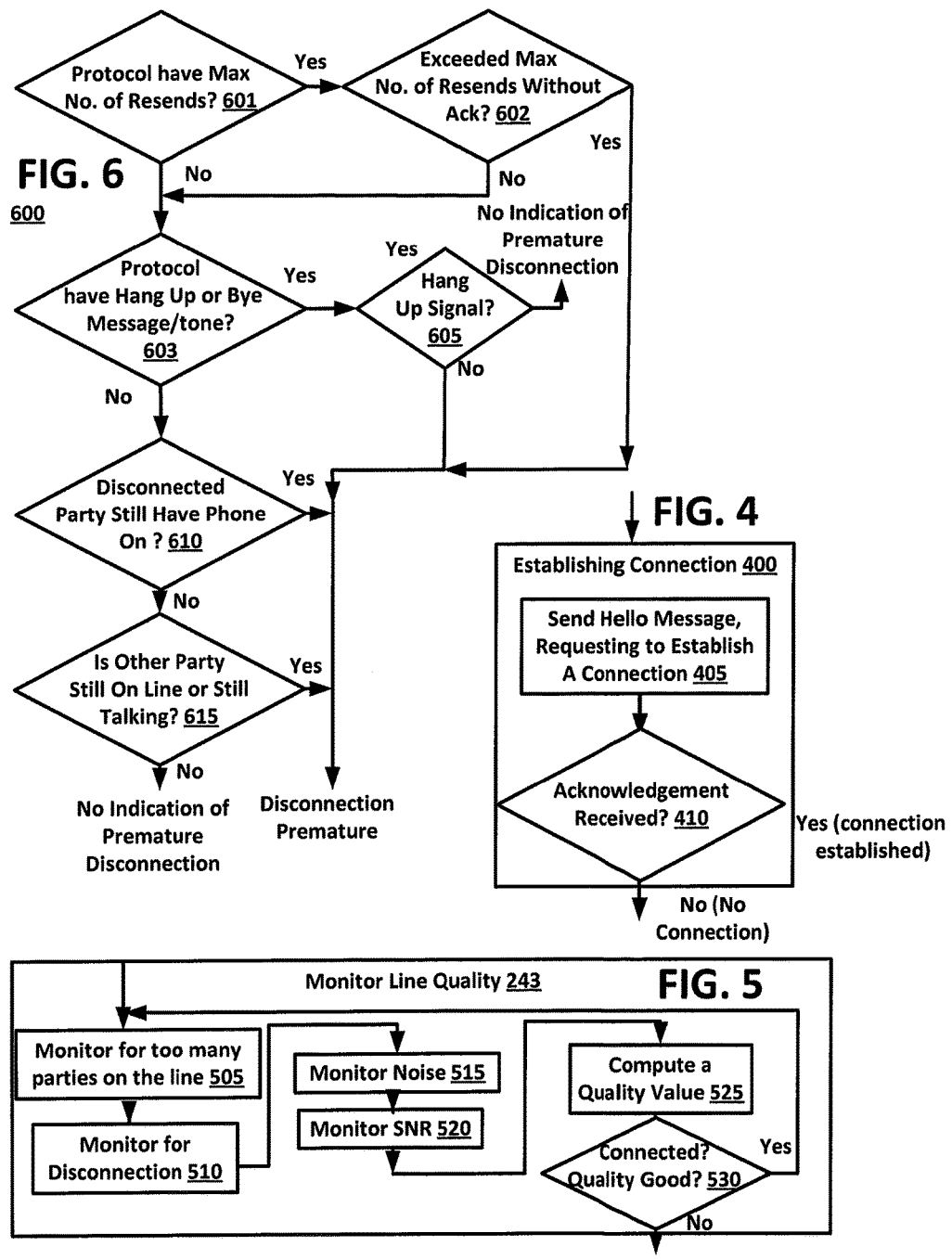

CALL RECONNECTION

BACKGROUND

Field of the Invention

The specification relates to call center systems in general and to the handling of dropped calls in particular.

Related Art

At times, for any number of reasons a caller may call a call center (within a call center system) for customer service or for other reasons, and the call may be inadvertently disconnected as a result of a malfunction, operator error, or user error, for example. The caller may have had to speak to a number of call agents prior to finding the correct call agent, wait on the phone for a significant amount of time before a call agent was available, and/or may have spent a significant amount of time explaining issues related to the reasons for the call. The caller then needs to call back, which involves repeating many of the steps previously performed to get to the same point where the caller was previously, which can make for an unnecessarily bad customer experience.

SUMMARY

When a call is received and a call agent is available, both the customer and the call agent are connected to a conference line (instead of an ordinary two party line). If either the customer or the agent is disconnected, that party is reconnected to the same conference line (since both parties were connected to a conference line, the line is not lost at both ends if one party is disconnected). Optionally, if, as a result of cross talk, a mix up on the part of the entity providing the conference, cross talk, a programming error, a mix up of connections (for example), a third party connects to the conference line, a new conference line is set up, and the caller and call agent are connected to the new conference line. To determine whether to reconnect a line, a check may be performed to determine whether a hang-up, or a goodbye, signal/tone was detected or whether the messaging protocol reached a maximum number of resends without receiving an acknowledgement. Optionally, the call may always be reconnected immediately in case the call was urgent. Optionally, the customer may be reconnected to the same agent, so that customer does not need to repeat information already conveyed to the first agent. To reconnect, a different VoIP service may be selected, and the customer may not necessarily need to be called back. Optionally, the customer may be called back and reconnected over an ordinary phone line.

Various embodiments include, a method comprising: receiving a call, at a call center system, from a client device of a caller; automatically connecting, by caller connection logic, the client device of the caller to a conference line; and automatically connecting, by the agent connection logic, a call agent to the conference line; determining, by disconnection analysis logic, that a party to the conference line was disconnected from the conference line, the party to the conference line being one of the client device of the caller and the call agent; detecting, by disconnection analysis logic, an indication that the party that was disconnected; and based on the detecting, automatically initiating, by reconnection logic, a reconnecting of the party to a conference line.

Various embodiments, include a system comprising: conference line logic configured to establish a conference line; caller connection logic configured to connect a client device of a caller to the conference line; agent connection logic configured to connect the agent to the conference line; disconnection detection logic configured to detect a disconnection of a line that was connected to the conference line; disconnection analysis logic configured to detect whether the disconnection was premature; and reconnection logic configured to initiate a reconnecting of the connection that was disconnected based on the disconnection analysis logic detecting the indication.

Various embodiments include a computer readable medium storing machine instructions, which when implemented cause a processor to implement a method comprising: receiving a call at a call center system from a client device of a caller, the call center system; automatically connecting, by caller connection logic, the client device of the caller to a conference line; and automatically connecting, by the agent connection logic, a call agent to the conference line; determining, by disconnection analysis logic, that a party to the conference line was disconnected from the conference line, the party to the conference line being one of the client device of the caller and the call agent; detecting, by disconnection analysis logic, an indication that the party that was disconnected; and based on the detecting, automatically initiating, by reconnection logic, a reconnecting of the party to the conference line.

BRIEF DESCRIPTION OF THE DRAWINGS

FIG. 2 illustrates a flowchart of an embodiment of a method for reconnecting dropped calls.

FIG. 3 illustrates a flowchart of an embodiment of a method of connecting or reconnecting the client device of the caller and call agent.

FIG. 4 illustrates a flowchart for an embodiment of a method of establishing connection.

FIG. 5 illustrates a flowchart of an embodiment of a method of implementing at least a part of a step of FIG. 2 and/or of FIG. 3 for monitoring the line quality.

FIG. 6 illustrates a flowchart of an embodiment of a method of determining whether a party was disconnected or simply hung up.

DETAILED DESCRIPTION

Figure 1:
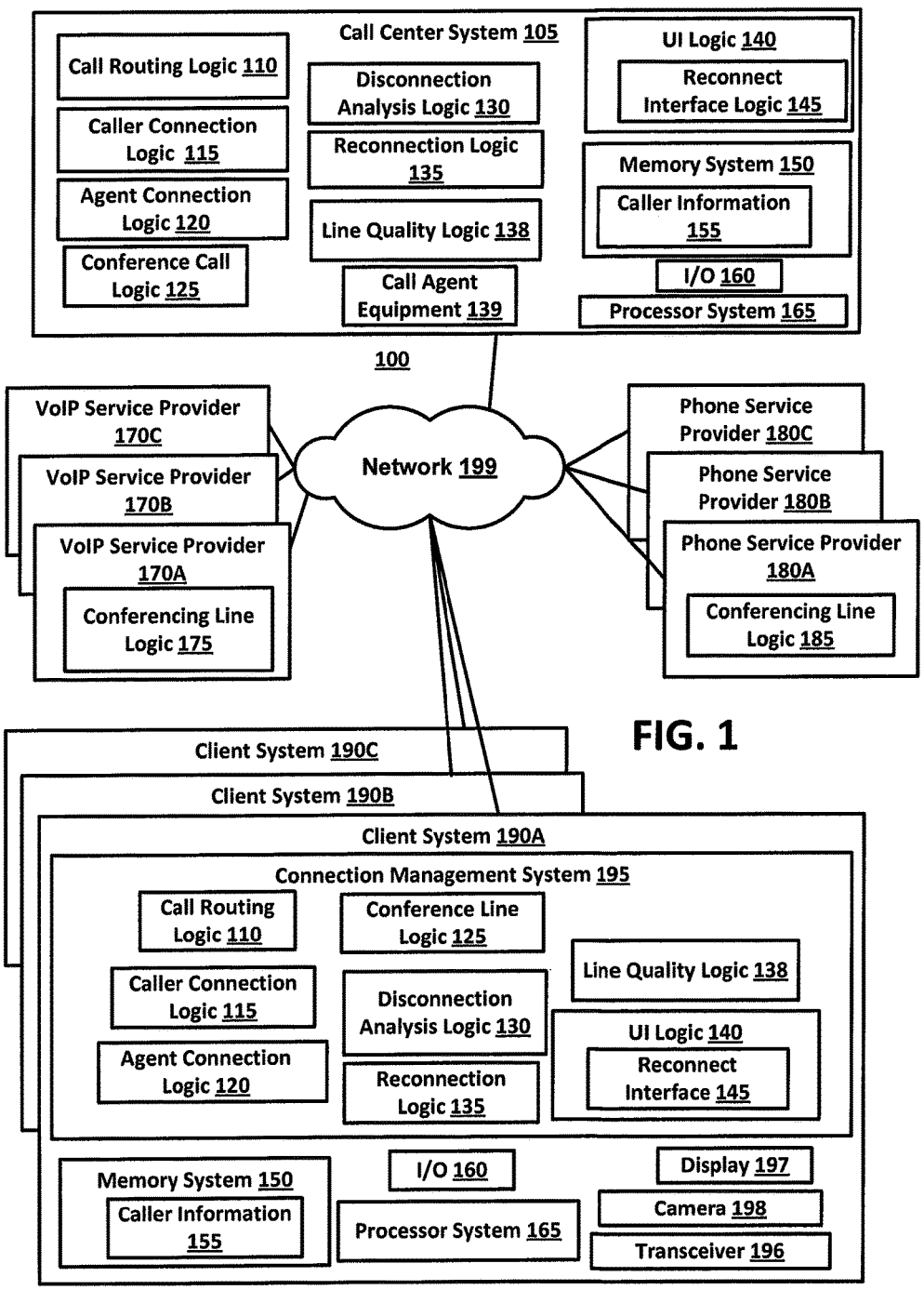
FIG. 1 illustrates a block diagram of an embodiment of a system in which dropped calls are reconnected.

A system and method that reconnects disconnected calls is disclosed. Both the caller and call agent are connected to a conference line, and then if the call agent or caller are disconnected, the system automatically reconnects the call agent or the caller.

Some Terminology Used in the Description

As used herein, the term "logic" means "hardware, firmware, and/or software stored on a non-transient computer readable medium." The logic may be configured to produce a specialty computing device from a general purpose computing device.

"Voice over Internet Protocol" (VoIP) is the delivery of voice communications sessions over Internet Protocol (IP) networks, such as the Internet, which optionally includes the provisioning of communications services over the public Internet, rather than via a public switched telephone network (PSTN).

"VoIP telephone calls" may involve signaling, channel setup, digitization of the analog voice signals, and encoding that is transmitted over an IP network. The digital information may be packetized, and transmission occurs as IP packets over a packet switched network. The packets transport audio streams with media delivery protocols that encode audio and video (e.g., with audio and optionally video codecs). The packets may be divided into smaller message segments.

The term "message" is generic to packets, smaller message segments, and other messages of other sizes, which may be individually sent over the network, and may each have their own header having at least destination information.

A "phone connection" or a "connection" between two devices over a packet switched network, may include each device sending packets (or smaller messages) of information having header information indicating the destination device and the message being routed to the destination. Optionally, in response, the destination device returns acknowledgement messages indicating that the messages sent were received. Setting up the connection may involve sending an initial hello message and confirming that an acknowledgement was received.

A "disconnection" occurs when, after already establishing a "connection," the messages sent are no longer routed to the destination or no longer arrive at the destination. It can happen that a message is sent and an expected acknowledgement is not received. Accordingly, a protocol may have the message resent and again wait for an acknowledgement. The protocol may retry to send the message only a limited number of times (a predetermined number of times or threshold number of times), after the predetermined number of tries to send a message, without receiving an acknowledgement, the protocol considers the connection broken. Optionally, a "disconnection" occurs when acknowledgements are still not received even after attempting to send messages the predetermined number of times set by the protocol. In a "circuit switched network," each call is given a dedicated line and a disconnection is a loss of a connection to the physical line.

As used herein, a "conference line" is a "smart line" that has a session that persists despite one party being disconnected. The "smart line" includes logic that reconnects the line in the event of a disconnection, and which detects the state of each end to determine whether to reconnect the line. The smart line may include an addressable socket at each end, so that when there is a disconnection, a socket exists that can be addressed for the purposes of reestablishing the connection. Optionally, the state of the caller and call agent may be monitored by the "smart line." Optionally, there may be an intermediary between the two parties, via which the messages are exchanged. In the embodiment, in which there is an intermediary, because of the intermediary, at least part of a conference call persists even after one of the parties is disconnected. In an embodiment, in which there may be an intermediary, the connection may be said to have "two legs" that connect to the "conference line"—one "leg" connects the caller to the conference line and one "leg" connects the call agent to the conference line, where the "conference line" is the intermediary. The intermediary may be a server that both parties connect to, which optionally may be a conference line service, or may be wires dedicated for the conference call. The "leg" associated with the caller, may be referred to as the "caller line," and the "leg" associated with the call agent, may be referred to as the "call agent line."

A conference call can include 2, 3 or more parties, each communicating, via the intermediary. A "conference call" is a call made in which communications occur, via the conference line. In a conference call, optionally, the parties to the conference call send messages to an address, on a machine of a service provider (intermediary), where the address is the address of the intermediary. The messages received by the intermediary may then be forwarded/sent (e.g., with new header information having new destinations) from the intermediary to the other parties on the conference line. So that, in this embodiment of a conference line, all messages (e.g., in the header information) have either the intermediary as the destination address or have the intermediary as the source address of the message. In other words, in an embodiment having an intermediary, no messages are passed directly between any of the parties of the conference call, but instead are first sent to the intermediary and then sent from the intermediary to all of the other parties, except for possibly the sender. The "socket" is an endpoint for sending and/or receiving messages at a single node in a computer network (e.g., the caller or call agent). A "socket" may be a representation of the endpoint in networking software (the protocol stack), such as an entry in a table (listing a communication protocol, destination, status, etc.) and may be a form of system resource. The "protocol stack," which may also be referred to a network stack, is an implementation of a computer network "protocol suite." The terms "protocol stack," "network stack," and "protocol suite" may be used interchangeably. The "protocol suite" may define the communication protocols, and the "stack" may be the software implementation of the protocol. The "protocol" is a system of rules that allow two or more entities of a communications system to transmit information, without regard to a specific type of hardware or software. The protocol defines rules syntax, semantics and synchronization of communications and possible error recovery methods. Protocols may be implemented by hardware, software, or a combination of both. By having an addressable socket at both ends, there is no need for an intermediary. A "resource" is any physical or virtual component of limited availability within a computer system. A "session" is an interactive information interchange, also known as a dialogue, a conversation, or a meeting, between two or more communicating devices. A session is "semi-permanent," is the sense that a session is set up or established at a certain point in time, and remains set up until intentionally ended at some later point. An established communication session may involve more than one message in each direction. Establishing a "session" may be part of establishing a connection. A "session" is an exchange of messages, although some of the messages may only be an acknowledgment of a receipt of a message. In an embodiment, a "session that persists" is a session that is not ended by a disconnection, even if only one party has not been disconnected. Optionally, the session is "stateful," meaning that at least one of the communicating parts needs to save information about the session history in order to be able to communicate, as opposed to "stateless" communication, where the communication consists of independent requests with responses. In an embodiment, a session is not ended by a disconnection, unless the state of the party that disconnected is determined to have a state that is associated with an intentional disconnection.

In another embodiment, each party to the "conference call" sends messages directly to all parties to the conference call (e.g., via the addressable sockets), and optionally, all parties receiving the message return an acknowledgement. In an embodiment, when only one party is connected to the conference line, the line behaves as if the line is connected to another party, even though there is not necessarily anything that the line is actually connected to (other than the network and the session). For example, there is no dial tone and/or the image on the display indicates that a connection is still present, despite the line not being connected to anything other than the network and the session. Similarly, should someone try to call a party connected to the conference line, the caller receives a busy signal, and if the party receiving the call has call waiting, the party being called receives and indication that someone is trying to call them. Likewise, to reach a party connected to the conference line, without relying on a call waiting feature (or using a completely different phone or device that that party owns), one calls the conference line, and then, in addition to being connected to that party the one who called the conference line is connected to everyone connected to the conference line. In a circuit switched phone line, the conference line (e.g., a stretch of physical wires, fiber optic cables, or other cables) would still remain dedicated to the call after the caller disconnects and may remain dedicated for the call for as long as the line is reserved or as long as at least one caller is connected to the conference line. Conference lines using packet switched networks that do not have an intermediary, may be referred to as "virtual conference lines."

"Receiving a call" refers to receiving a request to establish a connection for voice communications or multimedia communications. A "caller" refers to a person attempting to make a call or whom is currently making a call. In this specification, whenever a "caller" or "call agent" is mentioned, it is to be understood that the "caller" is associated with a client device (or other calling device), with which the caller makes the call. A "call agent" refers to an agent that responds to questions or issues in response to the call of the "caller." In this specification, whenever a "call agent" is mentioned, it is to be understood that the "call agent" is associated with a client device and/or equipment associated with the call center system or other equipment for communicating with callers. The dropping of a call refers to the unintentional disconnection of the line.

A "party" is a term that is to be understood to be generic to a caller or call agent or another participant to a voice or multimedia communication. The term "analysis," as in "analysis logic," "disconnection analysis," or "quality analysis," is to be understood as being generic to performing an analysis, analyzing the cause or nature of an event. An "analysis" may involve a complex computation, which may involve computing the value of several variables that are combined (e.g., in a weighted sum) or may be a simple computation, such as a comparison of whether the value is above or below a predetermined threshold (or any degree of complexity in between).

The term "automatically" refers to performing an action, via a microprocessor. "Reconnection" and "reconnecting" refer to connecting two parties, which were previously connected, but the connection was broken. A "reconnection" may include reconnecting using the same original connection or a different connection. "Detecting" or "to detect" refers to determining that a particular event occurred, or stimulus or signal was produced. The terms, such as "first party" and "second party," unless otherwise indicated, do not indicate an order of the parties, but the terms "first" and "second" are used to differentiate the parties from one another. The phrase "entered input" refers to interacting with an interface to create a signal and/or enter a value into a machine. Being disconnected "prematurely" refers to being disconnected prior to the caller and/or the call agent intended to disconnect. "Line quality" refers to how easily parties can communicate with one another, how much noise is on the line, the signal to noise ratio, whether there are people on the same line that should not be on the same line. The ultimate in poor line quality is losing the connection and checking line quality is generic to only checking whether the line was disconnected and/or checking other issues contributing to, affecting, and/or indicating the quality of the line.

To "initiate" a reconnection or a connection, refers to performing an action that causes the reconnection or connection process to at least start.

Performing an action "immediately" refers to performing an action without intentionally delaying the action. The word "intentionally," is used to refer to actions that are caused by logic that was configured specifically for performing that action and "unintentionally" refers to an action that occurs that the logic was not specifically configured to perform. A "service provider" refers to an entity that makes a particular service available, which may include providing use of equipment that hosts the service. For example, a "phone service provider" provides equipment, via which phone calls may be made and received. "Calling back" a party refers to calling a party that was disconnected from a call, thereby reconnecting the party to the call, if the call back is successful.

A "computer readable medium" refers to a nontransient or nontransitory storage medium, which is a medium on which the information may be stored in nontransitory or nontransient manner.

FIG. 1 illustrates a block diagram of an embodiment of a System 100 in which dropped calls are reconnected. FIG. 1 includes Call Center System 105 having Call Routing Logic 110, Caller Connection Logic 115, Agent Connection Logic 120, Conference Call Logic 125, Disconnection Analysis Logic 130, Reconnection Logic 135, Line Quality Logic 138, Call Agent Equipment 139, UI Logic 140, Reconnection Interface Logic 145, Memory System 150, Caller information 155, I/O 160, and Processor 165. System 100 also includes VoIP Service Providers 170, individually referenced as 170A-170C, etc. Each of VoIP Service Providers 170 having at least an embodiment of Conferencing Line Logic 175, respectively. System 100 also includes Phone Service Providers 180, individually referenced as 180A-180C, etc. Each of Phone Service Providers 180 having at least Conferencing Line Logic 185. System 100 also includes Client Systems 190, individually referenced 190A-190C, etc. Each of Client Systems 190 having an embodiment of Connection Management System 195. Connection Management System 195, similar to Call Center System 105, may include embodiment of each Call Routing Logic 110, Caller Connection Logic 115, Agent Connection Logic 120, Conference Call Logic 125, Disconnection Analysis Logic 130, Reconnection Logic 135, Line Quality Logic 138, UI Logic 140, Reconnection Interface Logic 145, Memory System 150, Caller Information 155, I/O 160, and Processor 165, respectively. Client System 190 also includes Transceiver 196, Display 197, and Camera 198.

Call Routing Logic 110 is configured to route incoming callers to call agents. The routing of a call involves determining which call agent to connect a caller to. Call Routing Logic 110 may rout the caller to a call agent based on which call agent is free, based on the specialty of the call agent, the question of the caller, and/or the type of caller, for example. Call Routing Logic 110 may collect information about the user to determine where to the rout a call. The information gathered may also be used in determining whether a disconnection of a call was premature, unintentional, or intentional.

Caller Connection Logic 115 is configured to connect the caller to the call agent chosen by Call Routing Logic 110. Caller Connection Logic 115 connects the caller to the call agent by connecting both the caller and call agent to a conference line (which may have a session that persists despite a disconnection and may have addressable sockets associated with the caller and with the call agent). By default, Caller Connection Logic 115 establishes a connection, via a conference line (e.g., having an addressable socket at the caller end and at the call agent end, a session that persists despite the caller and/or call agent being disconnected, or that has an intermediary that the caller and call agent are connected to), even if it is anticipated that only the caller and call agent (two parties) will be involved in the call. Thus, a connection, via a conference line, is preferred even where a direct connection would be possible. The added costs, delay and complexity, relative to a direct connection, is made up for by the automatic reconnection features taught herein.

Agent Connection Logic 120 is configured to connect the agent to the caller chosen by Call Routing Logic 110. Agent Connection Logic 120 connects the call agent to the caller by connecting the call agent to a conference line that is set aside for connecting callers with call agents. In an embodiment in which there is an intermediary or a physical line, for example, the "conference line"—e.g., the intermediary address or physical line—optionally may be set aside or reserved in advance, and then allocated to specific a pair of caller and call agent (or a specific group of callers and call agents participating in the same call), as needed. Optionally a session ID and/or set up addressable sockets may be set aside for the conference line in advance of connecting the caller and call agent to the session. Optionally, upon receiving a call from a caller, a conference line is set aside for the caller, prior to selecting the call agent to answer the call. Alternatively, each particular call agent may have a conference line reserved for all calls that that particular call agent answers, and the caller is routed to the conference line associated with the call agent that is selected for answering the call.

Conference Call Logic 125 is configured to set up a conference line for the caller and call agent, and to conduct a phone call using the conference line, without necessarily requiring the caller or call agent to expressly request a conference line (e.g., the caller and/or call agent may not even know that they are being connected to the conference line). Conference Call Logic 125 may establish addressable sockets that are used for the conference line that will be used for the call. In an embodiment, Conference Call Logic 125 may establish an address and/or dedicates a line (e.g., a physical copper wire or an address associated with an intermediary device) for the conference call (the caller's leg of the connection and the call agent's leg of the connection are connected to the line dedicated to the conference call). Conference Call Logic 125 may establish the conference line using only internal resources or using an outside service, such as one of VoIP Providers 170 or Phone Service Providers 180. For example, in an embodiment, Conference Call Logic 125 sends messages to a service, such as one of VoIP Providers 170 or Phone Service Providers 180, which establishes addressable sockets, establishes an address and/or dedicates a line to a conference call (or otherwise sets up the conference line). In an embodiment, other callers can also call into the conference line.

Disconnection Analysis Logic 130 is configured to detect when a call was disconnected. Disconnection Analysis Logic 130 may be configured to detect when the leg of the connection of one party was disconnected, without that party hanging up. For example, Disconnection Analysis Logic 130 may detect the signal caused by a party hanging up and may be configured to detect the loss of a connection between the intermediary and one of the parties. As background, when a first party on a landline hangs up any party that was connected to a first party that remains on the line can hear the distinctive noise. Similarly, a distinctive noise is made when a mobile phone hangs up (however, the nature of the noise that is heard by those that remain on the line may be significantly different than the noise made by standard landline hang up). Continuing with the discussion of Disconnection Analysis Logic 130, when Disconnection Analysis Logic 130 detects the loss of a connection, a determination may be made whether the signals caused by the party hanging up were received (e.g., the electrical signals that generate the hang-up noise on the phones that remain on the line after the hang up) or whether the messaging protocol reached a maximum number of resends without receiving an acknowledgement of a message transmission. If the signal caused by hanging up the phone is not detected or if the maximum number of resends with no acknowledgement was reached, then the break in the connection was not an intentional hang up, and when the signal caused by the hanging up the phone is detected or when the maximum number of resends with no acknowledgement was not reached, the break in the connection was an intentional hang up. Disconnection Analysis Logic 130 may detect input from the caller and/or agent that a disconnection occurred. In cases where there is no distinction between an intentional hang up and a premature disconnection, Disconnection Analysis Logic 130 may detect that one of the parties has disconnected, but the other was not disconnected. When Disconnection Analysis Logic 130 detects that one of the parties has disconnected, but the other was not disconnected, Disconnection Analysis Logic 130 may cause the line to be reconnected. In an embodiment, Disconnection Analysis Logic 130, retrieves user information and determines whether the disconnection was premature based at least in-part on the user the information. For example, if Disconnection Analysis Logic 130 retrieves information that indicates that the call is highly time sensitive, such as an emergency call, a call to place a stock trade, a call to place a commodities trade, a call from an emergency service personnel (e.g., fire fighter, medic, nurse, doctor) while handling an emergency, the Disconnection Analysis Logic 130 may immediately reconnect a disconnection. In an embodiment if Disconnection Analysis Logic 130 may always immediately reconnect a disconnection. Optionally, if Disconnection Analysis Logic 130 retrieves information that indicates that the call is not highly time sensitive, Disconnection Analysis Logic 130 may wait a short moment after the disconnection, so as to determine whether the party remaining on the phone is actually in the process of hanging up, if it is determined that the party remaining on the phone is not in the process of hanging up, Disconnection Analysis Logic 130 may cause a reconnection to be initiated.

In an embodiment, if the party that was disconnected hung up, the Disconnection Analysis Logic 130 may cause a call back of the disconnected party. In an embodiment, Disconnection Analysis Logic 130 may initiate a reconnection of the call even if both parties were disconnected.

Reconnection Logic 135 is configured to reconnect the caller or the call agent to the conference line when Disconnection Analysis Logic 130 determines that the caller or call agent was dropped from the call. Optionally, if the caller is disconnected, the Reconnection Interface Logic 145 reconnects the caller to the same call agent. Optionally, a different VoIP provider, different phone service, and/or different conference call provider is used for the reconnected call than was used for the original call.

Line Quality Logic 138 is configured to determine the quality of the conference line. For example, Line Quality Logic 138 may monitor the conference line and determine whether one can detect a party that was not intended to be in the call. Line Quality Logic 138 may also check a conference line to ensure that the conference line is not currently in use, prior to the Caller Connection Logic 115 connecting the caller and Agent Connection Logic 120 connecting the call agent to the conference line.

Line Quality Logic 138 may also detect other aspects of the quality of the line, such as whether there is more than a threshold of static (or other noise) on the line and the volume of the parties to the line and if a particular noise threshold is reached and/or Line Quality Logic 138 may detect whether the signal to noise ratio is not above a certain threshold, and/or if the maximum volume is not high enough. If the quality of the line is not good enough, Line Quality Logic 138 may automatically disconnect conference line and, via Caller Connection Logic 115 Agent Connection Logic 120, and/or Conference Call Logic 125, reconnect the caller and the call agent to another conference line.

Call agent equipment 139 is equipment that is part of call center system 105 that may be used by call agents for communicating with callers.

UI Logic 140 is configured to create a user interface for the call agent and/or caller, which includes one or more widgets, via which the caller and/or call agent may indicate that call was prematurely disconnected.

Reconnection Interface Logic 145 is the part of the UI Logic 140 that allows the user to indicate that a party was disconnected. Reconnection Interface Logic 145 may include a button to press to indicate that a disconnection was premature. Optional there may be a separate button for indicating whether the caller was disconnected and another button for indicating whether the call agent was disconnected. Alternatively, there may be just one button for indicating that the call was disconnected, and as a result of detecting that the button was pressed, may cause Reconnection Logic 135 to arrive at a determination that the caller or call agent was disconnected.

Memory System 150 stores information about the caller and call agent, which may be used to match a caller with a call agent and/or to determine whether disconnection was intentional. Memory System 150 may also include machine instructions, which may be carried out by one or more processors for implementing the call center, routing of calls to call agents, determining that a call was dropped, determining the quality of the line, setting up of a conference line, and connecting the caller and call agent to the conference line, and/or reconnecting dropped phone calls.

Caller information 155 may include information about the caller. The information about the caller may be obtained upon the user signing up to a service associated with the Call Center System 105. For example, the service may be a service provided by a customer of Call Center System 105 or Call Center System 105 may be dedicated to answering calls for the service provider. The information about the caller may be collected and stored by Call Routing Logic 110.

I/O 160 receives calls, sends messages to callers, and receives and sends messages to conference lines, conference service providers, and/or VoIP providers.

Processor 165 implements machine instructions stored in memory 150. Processor 165 may perform the same functions as Call Routing Logic 110, Caller Connect Logic 115, Agent Connection Logic 120, Conference Call Logic 125, Disconnection Analysis Logic 130, Reconnection Logic 135, Line Quality Logic 138, UI Logic 140, and Reconnection Interface Logic 145. For example, Processor 165 may receive a call from a caller, match the caller with a call agent, cause a conference line to be set up, connect the caller and call agent to the conference line, and then monitor the connections to determine the quality of service and whether the caller or call agent were disconnected from the call. If the caller and/or call agent are disconnected, Processor 165 may automatically reconnect the caller and/or call agent to the conference line or to another conference line, to reestablish the call.

VoIP Service Providers 170, which collectively will be referred to as VoIP Service Providers 170, provide phone service over a computer network using Internet Protocol. Caller Connection Logic 115, Agent Connection Logic 120, Conference Call Logic 125, and/or Reconnection Logic 135 may select one of VoIP Service Providers 170, based on current phone traffic/congestion information, past history of reliability, and/or current availability of phone lines and/or conference lines. However, optionally, Reconnection Logic 135 may select a different one of VoIP Service Providers 170 than was used for the original connection, to avoid a repeat of the dropping of the call.

Conferencing Line Logic 175 of VoIP Service Providers 170, respectively, which will collectively be referred to as Conferencing Line Logic 175, include conferencing lines, logic for establishing conference lines, and/or providing conference line services provided by VoIP Service Providers 170, to which the caller and call agent may be connected. In an embodiment, even if the same one of VoIP Service Providers 170 is used for the reconnecting the caller to the call agent a different conference line is used for reconnecting the caller and call agent.

Phone Service Providers 180, which will be referred to collectively as Phone Service Providers 180, provide ordinary phone service over phone network lines. Caller Connection Logic 115, Agent Connection Logic 120, Conference Call Logic 125, and/or Reconnection Logic 135 may connect the caller to the call agent, via Phone Service Providers 180 in addition to or instead of via VoIP Service Providers 170. For example, some callers may be connected to call agents over ordinary phone lines using Phone Service Providers 180, while other callers may be connected to call agents, via VoIP Service Providers 170. Yet, other callers may be connected to call agents, via a combination of VoIP Service Providers 170 and Phone Service Providers 180. Caller Connection Logic 115, Agent Connection Logic 120, Conference Call Logic 125, and/or Reconnection Logic 135 may select one of Phone Service Providers 180 and/or whether to use one of VoIP Service Providers 170 or one of Phone Service Providers 180, based on current phone traffic/congestion information, past history of reliability, and/or current availability of phone lines and/or conference lines.

Conferencing Line Logic 185 are configured to establish conferencing lines for Phone Service Providers 180, respectively. The callers and call agents may be connected to conferencing lines set up by Conferencing Line Logic 185, if Phone Service Providers 180, respectively, are selected for connecting the caller to the call agent.

Client Systems 190 are the systems used by the callers to connect to, or call, Call Center System 105 and/or make other phone calls. Optionally, client systems 190 may also be an embodiment of the call agent equipment 129, via which call agents connect to Call Center System 105 and/or communicate with callers. Client Systems 190 may be smart phones, mobile phones, tablet computers, laptop computers, personal computers, other computers, and/or other network devices. Optionally Client Systems 190 may interact with Call Center System 105 in a client server relationship. Alternatively, Client Systems 190 may interact with Call Center System 105 and/or other Client Systems 190 in a peer to peer relationship (e.g., optionally one of Client Systems 190 may be operated by the caller and one of Client Systems 190 may be operated by the call agent).

Connection Management Systems 195 are the portion of Client Systems 190, respectively, that connect with Connection Management Systems 195, handle the matching of a caller to a call agent, setting up a conference line, connecting the caller and call agent to the conference line, detect when one of the caller or call agent are disconnected, and reconnect the caller and call agent to the conference line, when a call is dropped. Connection Management Systems 195 may be any one of or any combination of downloadable application, may be firmware and/or hardware built into Client Systems 190, respectively.

In an embodiment, Call Routing Logic 110, Caller Connection Logic 115, Agent Connection Logic 120, Conference Call Logic 125, Disconnection Analysis Logic 130, Reconnection Logic 135, Line Quality Logic 138, UI Logic 140, Reconnection Interface Logic 145, and Caller Information 155 of Connection Management Systems 195 have the same functions as Call Routing Logic 110, Caller Connection Logic 115, Agent Connection Logic 120, Conference Call Logic 125, Disconnection Analysis Logic 130, Reconnection Logic 135, Line Quality Logic 138, UI Logic 140, Reconnection Interface Logic 145, and Caller information 155 of Call Center System 105, respectively. Call Routing Logic 110, Caller Connection Logic 115, Agent Connection Logic 120, Conference Call Logic 125, Disconnection Analysis Logic 130, Reconnection Logic 135, Line Quality Logic 138, UI Logic 140, Reconnection Interface Logic 145, and Caller Information 155 of Connection Management Systems 195; and Call Routing Logic 110, Caller Connection Logic 115, Agent Connection Logic 120, Conference Call Logic 125, Disconnection Analysis Logic 130, Reconnection Logic 135, Line Quality Logic 138, UI Logic 140, Reconnection Interface Logic 145, and Caller information 155 of Call Center System 105; respectively, are not both required. Their functions may be performed on any one of Client Systems 190 and Connection Management Systems 195 or a combination of both. It may be simpler to detect that the caller has been disconnected but has not hung up the phone using one of Disconnection Analysis Logic 130A-130C of Connection Management Systems 195 (because the break in the connection does not hinder Disconnection Analysis Logic 130 of Connection Management Systems 195 from detecting the status of Client Systems 190 and the status of the call from the point of view of Client Systems 190), whereas it may be simpler to detect that the call agent has been disconnected, but has not hung up the phone using Disconnection Analysis Logic 130 of Call Center System 105 (because the break in the connection does not necessarily hinder Disconnection Analysis Logic 130 Call Center System 105 from detecting the status of caller agent and the status of the call from the point of view of Call Center System 105).

Transceivers 196 may receive and send wireless signals for making and receiving phone calls and/or connecting to a computer network or other network. Transceivers 196 may include a microphone and speaker for receiving voice and emitting voice communications and/or ultrasound communications.

Displays 197 display information to the user, related to the phone or Internet connection. Displays 197 may display phone numbers, text messages, webpages, etc.

Cameras 198 may be used by the user to capture images and send the images to the call agent to better explain the issue that the caller is calling about and/or may be used for providing images of the caller as the caller is speaking to the call agent. I/O 160 may include Transceivers 196, Displays 197, and/or Cameras 198, respectively.

Network 199 may be any combination of Wide Area Networks (WANs), Local Area Networks (LANs), computer networks, and/or cellular network, ordinary phone networks, which may be packet switched, and/or circuit switched, for example.

FIG. 2 illustrates a flowchart of an embodiment of a method 200 implemented by system 100 for reconnecting dropped calls.

In step 205, a call from Client System 190A (for example) is received, by IO 160, at Call Center System 105.

In step 210, Client System 190A is connected to a call agent of Call Center System 105. The result of step 210 is that caller 220 and call agent 225 are connected, via conference line 230, to one another, where Call Agent 225 is connected, via Call Agent Line 235, to Conference Line 230 and Caller 220 is connected, via Caller Line 240, to Conference Line 230.

As part of step 210, Call Routing Logic 110 routes the call, by matching the caller with the call agent. Conference Call Logic 125 sets up Conference Line 230. Caller Connection Logic 115 connects the caller 220, by connecting Client System 190A, via Caller Line 240, to a conference line 230 (e.g., associated with one or more VoIP Service Providers 170 or Phone Service Providers 180). Agent Connection Logic 120 connects the Call Agent 225, via Agent Line 235, to the conference line 230.

In step 243, optionally Line Quality Logic 138 monitors the quality of the connection to determine whether the line has been disconnected, and optionally monitor whether there are other quality issues with the Conference Line 230, Agent Line 235, and/or Caller Line 240.

In step 245, Line Quality Logic 138 determines that either the Client System 190A of the Caller 220 or the system of the Call Agent 225 is disconnected. In one example of the state of the system, during step 245, in which the Caller Line 240 was disconnected. Optionally, Line Quality Logic 138 determines another issue with the quality of the line instead or in addition to the disconnection of one of the parties. However, step 245 may be the result of Agent Line 235 disconnecting (in addition to or instead of Client Line 240 disconnecting) or of the Caller 220 and/or Call Agent 225 hanging up.

Step 245 may involve Line Quality Logic 138 monitoring the quality of the line and and/or monitoring the lines (Conference Line 230, Call Agent Line 235, and/or Caller line 240) for a disconnection. After detecting a disconnection Line Quality Logic 138 may call Disconnection Analysis Logic 130 to determine whether the disconnection was the result of one party hanging up or whether the disconnection was not wanted.

In step 255, Disconnection Analysis Logic 130 determines whether the disconnection was intentional. Disconnection Analysis Logic 130 may search for different types of signals to determine whether the disconnection was intentional. For example, if a signal is received that is indicative of the caller or call agent hanging up (e.g. a hang up click) prior to receiving a dial tone, detecting a lack of any significant tone/signal on line, or other tone indicative of no connection, Disconnection Analysis Logic 130 may determine that the disconnection was intentional. Whereas, if no signal is received that is indicative of the caller or call agent hanging up (e.g. a hang up click) prior to receiving a dial tone, detecting a lack of any significant tone/signal on line, or other tone indicative of no connection, Disconnection Analysis Logic 130 may determine that the disconnection was unintentional. There may be other indicators whether the disconnection was unintentional, which Disconnection Analysis Logic 130 may use to arrive at a determination of whether the disconnection was intentional, such as the other party not hanging up very soon after the disconnection, and/or one of the caller or call agent continuing to talk, despite the disconnection.

If Disconnection Analysis Logic 130 determines that the disconnection was intentional (e.g., caller 220 hung up), the session is ended, and the method 200 ends. If Disconnection Analysis Logic 130 determines that the disconnection was not intentional (e.g., Caller 220 and the call Agent 225 did not hang up), the session is not ended, and the method 200 proceeds to step 260.

In step 260, Reconnection Logic 130 reconnects the party that was disconnected. Caller 220 is again connected to Call Agent 225, via Conference Line 230, Agent Line 235, and Caller Line 240. Reconnection Logic 130 may involve sending messages to one of the addressable sockets to reestablish the connection, while optionally retaining the same session ID as the original session ID for the session associated with the conference line.

As part of step 265, Reconnection Logic 130 may call Caller Connection Logic 115 to reconnect the Client Device 190A of the caller and/or Agent Connection Logic to reconnect the call agent. Alternatively, as part of step 265, Reconnection Logic 130 may call Conference Call Logic 125 to establish a new conference line and then call both Caller Connection Logic 115 and Agent Connection Logic 120 to reconnect both the caller and the call agent to a new conference line whether or not the caller and/or call agent were disconnected. After step 260, method 200 returns to step 243 and the loop is repeated until an intentional disconnection occurs, when method 200 ends.

FIG. 3 illustrates a flowchart of an embodiment of a method 300 of connecting or reconnecting the caller and call agent. Method 300 may be an embodiment of or part of an embodiment of step 210 and/or 260.

In step 305 Conference Call Logic 125 determines which of VoIP Service Providers 170 or Phone Service Providers 180 to choose for establishing the conference call. Step 305 may involve Conference Call Logic 125 determining current traffic conditions, prior records of reliability of service provided, and/or availability of conference call lines, for example, at each of Call Center System 105, VoIP Service Providers 170, and/or Phone Service Providers 180.

In step 310, Conference Call Logic 125 may send a message to one of Conference Logic 175 or Conference Logic 185 requesting a conference line, thereby causing a conference line to be established. Alternatively, Conference Call Logic 125 may establish the conference line itself. Step 310 is optional. Step 310 may be included in embodiments in which there is an intermediary.

In step 315, Line Quality Logic 138 may check the line quality prior to connecting the caller to the call agent. Line Quality Logic 138 may check whether other users are already using the conference line, the signal to noise ratio, the fidelity, and/or the latency associated with connection to the conference line. If the quality is not sufficient (e.g., the signal to noise ratio and fidelity are not above a certain threshold and/or the latency is not below a certain threshold) or if there is someone already on the conference line, Quality of Logic 138 returns the method back to step 305 to choose another service provider (and/or to choose a different conference line). If the quality is sufficient, method 300 proceed to step 320.

In step 320, the Client Device 190A of the caller is connected, by Caller Connection Logic 115 to the conference line.

In step 325, the call agent (e.g., Call Center System 105 and/or a Client Device 190B) is connected, by Agent Connection Logic 120 to a conference line. Steps 320 and 325 may be performed in any order and/or concurrently.

In step 330, if an addressable socket does not already exist at the Client Devices 190 and/or Call Center System 105 at the caller's end and/or at the call agent's end, as needed.

FIG. 4 illustrates a flowchart for an embodiment of a method 400 of establishing a connection. Method 400 may be included in an embodiment of steps 310, 315 and/or 320, for example. Method 400 may be implemented as part of Caller Connection Logic 115, Agent Connection Logic 120, Conference Call Logic 125, and/or Reconnection Logic 135. In step 405, a message is sent, which is a message that has the effect of requesting to establish a connection. Optionally, the message may be a HELLO message, which includes the time that the message was sent and course and destination information, and/or other information that may be helpful in sending messages, determining a rout for sending the messages, determining how long to expect it to take to receive an acknowledgement to a message. Correspondingly, the receiving party hopefully receives the message and sends an acknowledgement. In step 410, the sender waits for an acknowledgement. If the acknowledgement is received within a certain amount of time, the connection is established, and further communications may follow, the caller is connected to the conference line (in the case of Caller Connection Logic 115), or the call agent is connected to the conference line (in the case of Agent Connection Logic 120). If the acknowledgement is not received within a certain amount of time the connection is not established, and the sender may try again to establish the connection.

FIG. 5 illustrates an embodiment of a method 500 of implementing at least a part of step 243 of FIG. 2 and/or step 315 of FIG. 3 for monitoring the line quality, which may be performed by Line Quality Logic 138. In step 505, Line Quality Logic 138 monitors for whether there are too many people on the conference line. For example, Line Quality Logic 138 may determine whether messages from other parties that are not the caller or call agent, being received and acknowledged and/or being forwarded to the caller and/or call agent by the conference line of Conference Call Logic 125, Conferencing Line Logic 175A or Conferencing Line Logic 185A. If messages from other parties that are not the caller or call agent are being received, then there may be other parties on the conference line. In step 510, Line Quality Logic 138 monitors the communications to determine whether one of the parties was disconnected. In step 515, Line Quality Logic 138 monitors the noise in the communications. In step 520, Line Quality Logic 138 monitors the signal to noise ratio, which may be based on the noise measurements from step 515. Other factors may also be monitored such as latency, the frequency and/or number of dropped packets, the degree of queuing, and/or the fidelity of the sound. Steps 505-520 may be performed in any order or concurrently. In step 525, a quality of the line is computed by Line Quality Logic 138 based on information gathered in the prior steps. For example, a value may be associated with each factor measured, and all of the factors measured may be combined (e.g., in a weighted average) to produce a value that is representative of the quality. Steps 505, 515, 520, and 525 are optional.

FIG. 6 illustrates a flowchart of an embodiment of a method 600 of determining whether a party was disconnected or simply hung up, which may be performed by Line Quality Logic 138. Method 600 may be an embodiment of step 510 of FIG. 5. In step 601, a determination is made as to whether the protocol being used for the connection has a maximum number of times that a message may be resent without receiving an acknowledgement. If the protocol does, then the method proceeds to step 602. In step 602, a determination is made as whether the cause of the end of the communication was the repeated sending of a message without receiving of an acknowledgement of the message any of the times sent. The messaging protocol may include a maximum number of times that the same message is resent, because of the lack of the receipt of an acknowledgement. Once the maximum is reached, the communication ends. If the reason the line was disconnected was because the maximum number of retries to resend a message was reached without receiving an acknowledgement, then the disconnection was not intentional. After step 602, method 600 ends.

Returning to step 601, if a determination is made as to what protocol is being used, and whether the protocol being used for the connection does not have a maximum number of times that a message may be resent without receiving an acknowledgement, the method proceeds to step 603. In step 603, a determination is made whether the protocol has a hang up tone and/or goodbye message. If the protocol has a hang up tone or goodbye message, the method proceeds to step 605. In step 605, a determination is made whether the hanging up signal was detected. Optionally, a packet switched protocol may also include a specific message indicating the end of the communication session. When a phone hangs up, as part of the telephone protocol, an audio signal may be produced indicating that the phone was hung up, which when detected, indicates that the phone was hung up rather than a disconnection and when not detected indicates that the disconnection was unintentional. In an embodiment, after step 605, the method ends, but the state of the system is different depending upon whether a hang up was detected or was not detected. In another embodiment, after step 605, method 600 proceeds to the next step of method 600 (e.g., step 607). Optionally step 601 may come after steps 605. Returning to step 603, if the protocol does not have a hang up tone (step 603), or if step 603 proceeds step 601, in step 601 it is determined that the protocol does not have bye message, or maximum number of times that a message may be resent without receiving an acknowledgement, the method 600 proceeds to step 607. Steps 601 and 603 are optional. Step 602 may be performed without checking which protocol is in use and step 605 may be performed whether or not the protocol has a hang up signal or tone.

In step 607, a determination is made as to whether the caller or the call agent entered input, via Reconnect Interface Logic 145 and UI Logic 140, indicating that the a disconnection occurred. In step 607, a caller may enter input indicating that caller was disconnected or the call agent was disconnected. If either the caller or the call agent enters input, via Reconnect Interface Logic 145 and/or UI Logic 140, indicating that a disconnection occurred, then method 600 ends. If neither the caller nor the call agent enters input, via Reconnect Interface Logic 145 and UI Logic 140, indicating that a disconnection occurred, then method 600 proceeds to step 610.

In step 610, a determination is made whether the disconnected party still has the phone on. If the disconnected party has not hung up the phone yet, it is an indication that the disconnection was premature, and method 600 may be ended. If there is no indication that the disconnected party has the phone on after the disconnection, method 600 proceeds to step 615. In step 615, a determination may be made whether one of the parties continued to talk after the disconnection. If a party continued to talk after a disconnection, it is an indication that the disconnection was premature. Steps 610 and 615 may be performed in any order. After steps 610 and 615 the method ends. Steps 610 and 615 are optional. Only one of steps 602 or 605 are needed. In an alternative embodiment, there may be other tests, in addition to or instead of any or all of the above tests that are made to determine whether a particular disconnection was premature. In an embodiment, all of the tests of the method 600 are performed, and each is assigned a reliability, and then the results of all of the tests may be combined. If the value obtained is above/below a particular threshold, it may be assumed that the disconnection was premature. After method 600, method 500 proceeds to step 515, and the results of method 600 are used in steps 525 and 530 (FIG. 5).

Several embodiments are specifically illustrated and/or described herein. However, it will be appreciated that modifications and variations are covered by the above teachings and within the scope of the appended claims without departing from the spirit and intended scope thereof.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored on a computer readable medium. This logic may be implemented in an electronic device to produce a special purpose computing system.

The invention claimed is:

1. A method comprising:
   receiving a call at a call center system from a client device of a caller;
   automatically connecting, by caller connection logic, the client device of the caller to a conference line;
   automatically connecting, by the agent connection logic, a call agent to the conference line;
   determining, by disconnection analysis logic, that a party to the conference line was disconnected from the conference line, the party to the conference line being one of the client device of the caller and the call agent; and
   automatically initiating, by reconnection logic, a reconnecting of the party to the conference line.

2. The method of claim 1, the party being a first party to the call, the method further comprising detecting that a second party to the call is still connected, the first party and the second party being different from one another.

3. The method of claim 1, the party being a first party to the call, the method further comprising detecting that a second party to the call entered input indicating that the first party was disconnected prematurely, the first party and the second party being different from one another.

4. The method of claim 1, the client device of the caller and the call agent being automatically connected to the conference line even if the client device of the caller and the call agent are the only parties to the call.

5. The method of claim 1, further comprising:
   detecting a signal to noise ratio below a threshold on the conference line and automatically connecting the client device of the caller and the call agent to another conference line.

6. The method of claim 1, the automatically reconnecting of the party to the conference line being performed immediately upon the determining that the party was disconnected.

7. The method of claim 1, wherein determining that the party was disconnected includes determining that the disconnection occurred prematurely, based at least on information about the caller.

8. The method of claim 1, wherein determining that the party was disconnected includes determining that the disconnection occurred prematurely, based at least on information collected from the caller upon receiving the call.

9. The method of claim 8,
   after a predetermined delay after the determination that the party that was disconnected prematurely, detecting that a second party is still connected;
   the automatically reconnecting of the party to the conference line being performed after the predetermined delay.

10. The method of claim 1, wherein automatically connecting the party to the conference line is via a first service provider; and
    reconnecting the party to the conference line includes reconnecting the party using a second service provider that is different than the first service provider.

11. The method of claim 10, the first service provider being a voice over Internet protocol provider.

12. The method of claim 1, the automatically initiating of the reconnecting of the party to the conference line including at least calling back the party that was disconnected.

13. The method of claim 1, the automatically initiating of the reconnecting of the party to the conference line including at least automatically reconnecting the party that was disconnected prior to the party that was disconnected hanging up the phone.

14. The method of claim 1, the conference line including a first addressable socket associated with the caller and a second addressable socket associated with the call agent.

15. A system comprising:
    conference line logic configured to establish a conference line;
    caller connection logic configured to connect a client device of a caller to the conference line;
    agent connection logic configured to connect the agent to the conference line;
    disconnection detection logic configured to detect a disconnection of a line that was connected to the conference line;
    disconnection analysis logic configured to detect whether the disconnection was premature; and
    reconnection logic configured to initiate a reconnecting of the connection that was disconnected.

16. The system of claim 15, further comprising:
    conference line quality logic being configured to detect when a third party is on the conference line, the conference line quality logic being configured to automatically connect the client device of the caller and the call agent to another conference line in response to the detection of the third party on the conference line.

17. The system of claim 15, the reconnection logic being configured to immediately reconnect a disconnected party upon detecting an indication that the disconnected party was disconnected prematurely.

18. The system of claim 15, wherein the conference line includes a first addressable socket associated with the caller and a second addressable socket associated with the call agent.

19. A non-transitory computer readable medium storing machine instructions, which when implemented cause a processor to implement a method comprising:
    receiving a call at a call center system from a client device of a caller;
    automatically connecting, by caller connection logic, the client device of the caller to a conference line; and
    automatically connecting, by the agent connection logic, a call agent to the conference line;
    determining, by disconnection analysis logic, that a party to the conference line was disconnected from the conference line, the party to the conference line being one of the client device of the caller and the call agent; and based on the determination that the party was disconnected, automatically initiating, by reconnection logic, a reconnecting of the party to the conference line.

* * * * *